United States Patent Office 2,947,744
Patented Aug. 2, 1960

2,947,744

4-AMINOALKANOYL-2,3-DIHYDRO-1,4-BENZO-THIAZINES AND PROCESS

Harman S. Lowrie, Northbrook, Ill., assignor to G. D. Searle & Co., Chicago, Ill., a corporation of Delaware No Drawing. Filed Oct. 27, 1958, Ser. No. 769,574

10 Claims. (Cl. 260—243)

This invention relates to optionally halogenated 4-aminoalkanoyl-2,3-dihydro-1,4-benzothiazines and a process for the manufacture thereof. More particularly, this invention relates to compounds of the formula

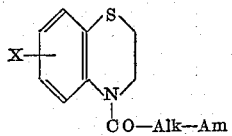

wherein X is halogen, Alk is a lower alkylene radical, and Am is an amino radical which may—or may not—be alkylated.

In the foregoing structural formula, the halogens comprehended by X are specifically fluorine, chlorine, bromine, and iodine in any of the positions 5 through 8, as shown. However, a 6-chloro substituent is preferred.

The lower alkylene radicals herein represented by Alk are bivalent, saturated, acyclic, straight- or branched-chain hydrocarbon radicals of empirical formula $$C_nH_{2n}$$

wherein $n$ is a positive integer greater than 1, and which are exemplified by:

1,2-propylene (—CH$_2$CHCH$_3$)

Tetramethylene (—CH$_2$CH$_2$CH$_2$CH$_2$—)

2-methyl-1,2-propylene (—CH$_2$CCH$_3$)
                                              CH$_3$ 2,4-pentylene (CH$_3$CHCH$_2$CHCH$_3$)

2,2-dimethyl-1,3-propylene (—CH$_2$CCH$_2$—)
                                                         CH$_3$ 3-methyl-1,4-butylene (—CH$_2$CH$_2$CHCH$_2$—)
                                                 CH$_3$ Hexamethylene (—CH$_2$CH$_2$CH$_2$CH$_2$CH$_2$CH$_2$—)

and like radicals.

Am in the generic formula for compounds of this invention subsumes both the unsubstituted amino radical, —NH$_2$, and the amino radical as modified by introduction of 1 or 2 alkyl groups—especially lower alkyl groups, such as methyl, ethyl, propyl, isopropyl, butyl, isobutyl, secondary butyl, tertiary butyl, pentyl, secondary normal pentyl, primary isopentyl, secondary isopentyl, tertiary pentyl, and sundry hexyl groups. Where alkyl groups are present, these may be discreet, as when Am designates a radical of the formula

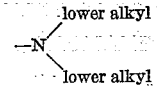

or, in the case of ethyl radicals, they may be joined together through oxygen or nitrogen to form the morpholino and piperazino groupings, respectively. Alternatively, appropriate alkyl constituents may be directly joined to form pyrrolidino or piperidino groupings. Still further, the cyclic amino radicals referred to can themselves be nuclearly alkylated, as with 1 or more lower alkyl groupings; and the latter, it has been found, can be substituted by hydroxy radicals if desired. Among the hydroxy(lower alkyl)-substituted cyclic amino radicals of choice, piperidine and piperazine derivatives are preferred.

Equivalent to the basic amines of this invention for the purposes here described are non-toxic acid addition and quaternary ammonium salts thereof, the compositions of which may be symbolized by

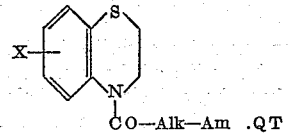

wherein X, Alk, and Am have the meanings hereinbefore assigned; Q is selected from among hydrogen and lower alkyl, hydroxy(lower alkyl), and lower alkenyl radicals, as also such aralkyl radicals as benzyl, phenethyl, and naphthylmethyl; and T is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Thus, for example, they share with undecylenic acid the capacity to inhibit Trichophyton mentagrophytes, and accordingly are anti-fungal agents. Further, the subject compositions manifest anti-inflammatory activity, being adapted to prevention of the edema and associated responses characteristic of tissue injury. Finally, the compounds of this invention are central nervous system depressants: they induce tranquility and ataraxia apparently untroubled by mental or emotional excitation.

The compounds herein disclosed can be variously manufactured, but a preferred procedure comprises contacting for as long as several hours at elevated temperatures and in an inert solvent a 4-haloalkanoyl-2,3-dihydro-1,4-benzothiazine of the formula

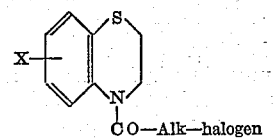

with an amine

Am—H

X, Alk, and Am having the meanings hereinbefore specified. Suitable solvents are ethanol, butanone, toluene, dimethylformamide, and the like, a representative set of conditions for the contemplated preparations being 12 hours at reflux temperatures in butanone medium. An acid acceptor such as a tri(lower alkyl)amine or an alkali carbonate, hydroxide, or amide, and a catalyst such as sodium iodide, may be incorporated in the reaction mixture if desired.

Conversion of the amine bases hereof to corresponding acid addition salts is accomplished by simple admixture of these compounds with 1 equivalent of any of various inorganic and strong organic acids, the anionic portion of which conforms to T as hereinabove defined.

The quaternary ammonium compounds comprehended by this invention are those derived by contacting a claimed base with 1 equivalent of an organic ester of the formula

Q—T

Q and T being limited by the meanings hereinbefore assigned, and it being additionally provided that Q is not hydrogen. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately 1 hour.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter set forth, temperatures are given in degrees centigrade and relative amounts of materials in parts by weight, except as otherwise noted.

EXAMPLE 1

A. *4 - (3 - chloropropionyl) - 2,3 - dihydro - 1,4 - benzothiazine.*—Approximately 74 parts of 2,3-dihydro-1,4-benzothiazine dissolved in 420 parts of ether is mixed with 400 parts of aqueous 10% sodium hydroxide; and to this mixture is added, with agitation, 127 parts of 3-chloropropionyl chloride dissolved in 280 parts of ether. Agitation is maintained for 2 hours thereafter, at which point the ethereal phase is separated and consecutively washed with water, dilute hydrochloric acid, and water again. The resultant solution is dried over anhydrous potassium carbonate and stripped of solvent by distillation. The oil which remains is 4-(3-chloropropionyl)-2,3-dihydro-1,4-benzothiazine, which crystallizes on standing.

B. *4 - (3 - dimethylaminopropionyl) - 2,3 - dihydro - 1,4-benzothiazine hydrochloride.*—A mixture of 7 parts of 4 - (3 - chloropropionyl) - 2,3 - dihydro - 1,4 - benzothiazine, 2 parts of sodium iodide, 6 parts of dimethylamine, and 120 parts of butanone is heated in a sealed vessel at 75° for 60 hours. The mixture is then cooled, filtered, and stripped of solvent by distillation. The oil which remains is taken up in a mixture of benzene and dilute aqueous potassium hydroxide, whereupon the benzene phase is separated and consecutively washed with dilute aqueous potassium hydroxide and water. The resultant material is extracted with dilute hydrochloric acid; and the acid extract, after being washed with ether, is made basic with dilute aqueous potassium hydroxide. The mixture thus obtained is extracted with benzene; and this benzene extract is washed with water, dried over anhydrous potassium carbonate, and freed of solvent by evaporation. The oily residue is dissolved in anhydrous ether, and to the ether solution is added an excess of hydrogen chloride in saturated 2-propanol solution. The precipitate which forms tis filtered off and twice recrystallized from acetone to give the desired 4-(3-dimethylaminopropionyl) - 2,3 - dihydro - 1,4 - benzothiazine hydrochloride, melting at 130–132°. The product has the formula

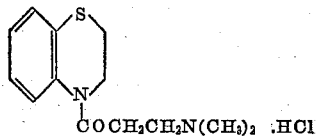

EXAMPLE 2

A. *6-chloro-4-(3-chloropropionyl)-2,3-dihydro-1,4-benzothiazine.*—To a mixture of 100 parts of aqueous 10% sodium hydroxide with a solution of approximately 28 parts of 6-chloro-2,3-dihydro-1,4-benzothiazine in 180 parts of benzene is added, with vigorous agitation, 38 parts of 3-chloropropionyl chloride dissolved in 45 parts of benzene. The resultant mixture is vigorously agitated for 2 hours and then diluted with 270 parts of benzene. The organic layer is thereupon separated and consecutively washed with water, dilute hydrochloric acid, and water again. It is then dried over anhydrous potassium carbonate and freed of benzene by distillation. The oily residue is 6-chloro-4-(3-chloropropinyl) - 2,3 - dihydro-1,4-benzothiazine, which crystallizes on standing. Recrystallized from hexane, the product melts at 110–112°.

B. *6-chloro-4-(3-dimethylaminopropionyl)-2,3-dihydro-1,4-benzothiazine hydrochloride.*—A mixture of 20 parts of 6-chloro-4-(3 - chloropropionyl) - 2,3 - dihydro - 1,4-benzothiazine, 3 parts of sodium iodide, 9 parts of dimethylamine, and 120 parts of butanone is heated at 75° for 60 hours in a sealed vessel and then worked up as detailed in Example 1B hereinabove, excepting only that chloroform is used in place of benzene during the processing operations and crystallization of the product from acetone is unnecessary. The 6-chloro-4-(3-dimethylaminopropionyl)-2,3-dihydro - 1,4 - benzothiazine hydrochloride thus obtained melts at 182–183° and has the formula

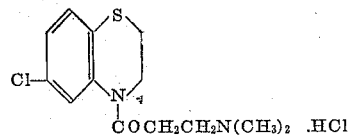

EXAMPLE 3

A. *4-(4-chlorobutyryl)-2,3 - dihydro-1,4-benzothiazine.* —A mixture of 37 parts of 2,3-dihydro-1,4-benzothiazine, 200 parts of aqueous 10% sodium hydroxide, 79 parts of 4-chlorobutyryl chloride, and 350 parts of ether is reacted together in accordance with the procedure detailed in Example 1A to give 4-(4-chlorobutyryl)-2,3-dihydro-1,4-benzothiazine.

B. *4-(4-diethylaminobutyryl)-2,3-dihydro-1,4-benzothiazine.*—A mixture of 27 parts of 4-(4-chlorobutyryl)-2,3-dihydro-1,4-benzothiazine, 28 parts of diethylamine, 4 parts of sodium iodide, and 240 parts of butanone is heated in a sealed vessel at 70° for 12 hours. The mixture is then cooled, following which it is filtered and the filtrate stripped of solvent by distillation. The residual oil is taken up in benzene; and the benzene solution, in turn, is consecutively washed with dilute aqueous potassium hydroxide and water, and then extracted with dilute hydrochloric acid. The acid extract is washed with ether and then made basic with dilute aqueous potassium hydroxide. The resultant mixture is extracted wtih benzene, and this benzene extract is washed with water and then dried over anhydrous potassium carbonate. Evaporation of solvent leaves as the resdue 4-(4-diethylaminobutyryl)-2,3-dihydro-1,4-benzothiazine, which has the formula

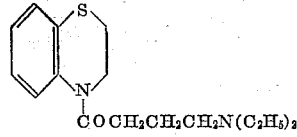

EXAMPLE 4

A. *2,3-dihydro - 4 - (3-piperidinopropionyl)-1,4-benzothiazine.*—A mixture of 17 parts of 4-(3-chloropropionyl)-2,3-dihydro-1,4-benzothiazine, 17 parts piperidine, 3 parts of sodium iodide, and 320 parts of butanone is heated at the boiling point under reflux for 12 hours. The mixture is then filtered, and the filtrate is stripped of solvent by distillation. The resultant oil is taken up in chloroform, and the chloroform solution is washed with dilute aqueous potassium hydroxide and then with water. The solution is then extracted with dilute hydrochloric acid; and the acid extract, in turn, is washed with ether and then made basic with dilute aqueous potassium hydroxide. The resultant mixture is extracted with chloroform; and this chloroform extract is washed with water, dried over anhydrous potassium carbonate, and finally freed of solvent by evaporation. The oil which remains is 2,3-dihydro-4-(3-piperidinopropionyl) - 1,4 - benzothiazine, the formula of which is

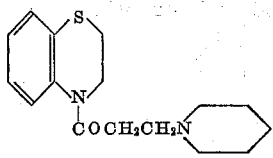

B. *2,3-dihydro-4-(3-piperidinopropionyl)-1,4-benzothiazine hydrochloride.*—To an ether solution of 2,3-dihydro-4-(3-piperidinopropionyl)-1,4-benzothiazine is added a slight excess of hydrogen chloride dissolved in 2-propanol. The precipitate thrown down is 2,3-dihydro-4-(3-piperidinopropionyl)-1,4-benzothiazine hydrochloride, the melting point of which is 160–162°.

EXAMPLE 5

A. *4-(4-chlorovaleryl)2,3-dihydro-1,4-benzothiazine.*—Using the technique of Example 1A, 4-(4-chlorovaleryl)-2,3-dihydro-1,4-benzothiazine is prepared from 32 parts of 2,3-dihydro-1,4-benzothiazine, 500 parts of aqueous 10% sodium hydroxide, 78 parts of 4-chlorovaleryl chloride, and 700 parts of ether.

B. *2,3-dihydro-4-[4-(3-hydroxymethylpiperidino)valeryl]-1,4-benzothiazine.*—A mixture of 28 parts of 4-(4-chlorovaleryl)-2,3-dihydro-1,4-benzothiazine, 23 parts of 3-(hydroxymethyl)piperidine, 3 parts of sodium iodide, 20 parts of triethylamine, and 320 parts of butanone is heated at the boiling point under reflux with agitation for 12 hours. The reaction mixture is then worked up as detailed in Example 3B to give 2,3-dihydro-4-[4-(3-hydroxymethylpiperidino)valeryl] - 1,4 - benzothiazine, the formula of which is

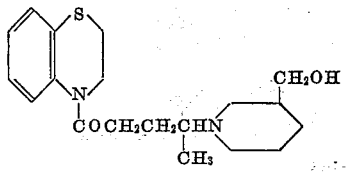

EXAMPLE 6

A. *2,3-dihydro-4-{3-[4-(3-hydroxypropyl)piperidino]-propionyl}-1,4-benzothiazine.*—Using the technique of Example 4A, 17 parts of 4-(3-chloropropionyl)-2,3-dihydro-1,4-benzothiazine, 14 parts of 4-(3-hydroxypropyl)piperidine, 3 parts of sodium iodide, 10 parts of triethylamine, and 320 parts of butanone is reacted together to give 2,3-dihydro-4-{3-[4 - (3 - hydroxypropyl)piperidino]propionyl}-1,4-benzothiazine of the formula

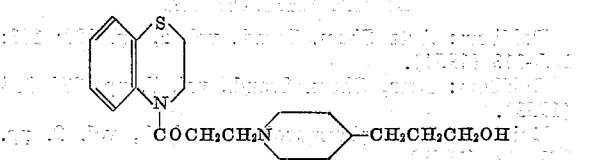

B. *2,3-dihydro-4 - {3 - [4 - (3 - hydroxypropyl)piperidino]propionyl}-1,4-benzothiazine hydrochloride.*—To a slight excess of hydrogen chloride dissolved in a mixture of 2-propanol and acetone is added 2,3-dihydro-4-{3-[4-(3 - hydroxypropyl)piperidino]propionyl} - 1,4 - benzothiazine dissolved in anhydrous ether. The resultant mixture is maintained at 0° overnight, following which the supernatant liquors are decanted and the residual gum then crystallized by boiling with acetone. The product thus obtained is 2,3-dihydro-4-{3-[4-(3-hydroxypropyl)-piperidino]propionyl} - 1,4 - benzothiazine hydrochloride, melting at 171–174°.

EXAMPLE 7

*2,3-dihydro-4-(3-piperazinopropionyl)-1,4 - benzothiazine.*—A mixture of 121 parts of 4-(3-chloropropionyl)-2,3-dihydro-1,4-benzothiazine, 172 parts of piperazine, 30 parts of sodium iodide, and 3200 parts of butanone is heated at the boiling point under reflux for 12 hours. The solvent is then evaporated and the residue is taken up in chloroform. The chloroform solution is washed consecutively with dilute aqueous potassium hydroxide and water, then extracted with dilute hydrochloric acid. The acid extract, in turn, is washed with ether and then made basic with dilute aqueous potassium hydroxide. The resultant mixture is extracted with chloroform, and the chloroform extract is washed with water and dried over anhydrous potassium carbonate. Upon distillation of solvent, there is obtained as the residue, pure 2,3-dihydro-4-(3-piperazinopropionyl)-1,4-benzothiazine, the formula of which is

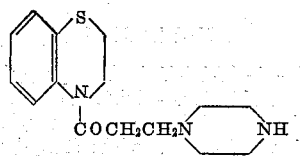

EXAMPLE 8

*2,3-dihydro-4-[3-(4-methylpiperazino)propionyl] - 1,4-benzothiazine.*—Substitution of 185 parts of N-methylpiperazine for the 172 parts of piperazine called for in the preceding Example 7 affords, by the procedure there described, 2,3 - dihydro-4-[3-(4-methylpiperazino)propionyl]-1,4-benzothiazine, of the formula

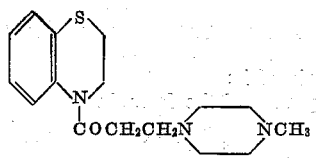

EXAMPLE 9

A. *2,3-dihydro-4-{3-[4-(2-hydroxyethyl) - piperazino]propionyl}-1,4-benzothiazine.*—A mixture of approximately 12 parts of 4-(3-chloropropionyl)-2,3-dihydro-1,4-benzothiazine, 13 parts of N-(2-hydroxyethyl)piperazine, 3 parts of sodium iodide, and 320 parts of butanone is reacted together in accordance with the procedure described in Example 4A to give 2,3-dihydro-4-{3-[4-(2-hydroxyethyl)piperazine]propionyl}-1,4-benzothiazine, of the formula

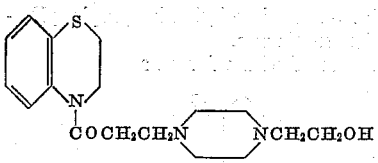

B. *2,3-dihydro-4-{3-[4-(2-hydroxyethyl) - piperazino]propionyl}-1,4-benzothiazine maleate.*—A solution of 50 parts of 2,3 - dihydro-4-{3-[4-(2-hydroxyethyl)piperazino]propionyl}-1,4-benzothiazine and 36 parts of maleic acid in 1200 parts of ethanol is concentrated to ½ volume by distillation. The precipitate thrown down is filtered off, washed with ether, and dried. This material is 2,3 - dihydro-4-{3-[4-(2-hydroxyethyl)piperazino]propionyl}-1,4-benzothiazine maleate, the melting point of which is approximately 144–145°.

EXAMPLE 10

A. *6-chloro - 2,3 - dihydro-4-{3-[4-(2-hydroxyethyl)-piperazino]propionyl}-1,4-benzothiazine.*—A mixture of 19 parts of 6-chloro-4-(3-chloropropionyl)-2,3-dihydro-1,4-benzothiazine, 18 parts of N-(2-hydroxyethyl)piperazine, 5 parts of sodium iodide, and 320 parts of butanone is heated at the boiling point under reflux for 12 hours with agitation. The reaction mixture is thereupon filtered and worked up in accordance with the procedure detailed in Example 4A hereinabove to give 6-chloro-2,3-dihydro-4 - {3 - [4 - (2 - hydroxyethyl)piperazino]propionyl}-1,4-benzothiazine. The product has the formula

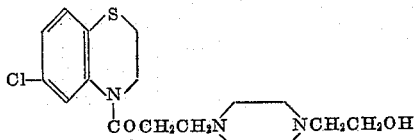

B. *6-chloro - 2,3 - dihydro-4-{3-[4-(2-hydroxyethyl)-piperazino]propionyl}-1,4-benzothiazine maleate.*—Using the technique of Example 9B, 6-chloro-2,3-dihydro-4-{3-[4-(2-hydroxyethyl)piperazino]propionyl} - 1,4 - benzothiazine is reacted with maleic acid in ethanolic medium to give the corresponding maleate, which melts at 135–137°.

EXAMPLE 11

*2,3 - dihydro - 4 - {4-[4-(3-hydroxypropyl)piperazino]-butyryl}-1-4-benzothiazine.*—Using the technique of Example 4A, 135 parts of 4-(4-chlorobutyryl)-2,3-dihydro-1,4-benzothiazine, 144 parts of N-(3-hydroxypropyl)piperazine, 30 parts of sodium iodide, and 3200 parts of butanone is reacted together to give 2,3-dihydro-4-{4-[4-(3-hydroxypropyl)piperazino]butyryl} - 1,4 - benzothiazine, the formula of which is

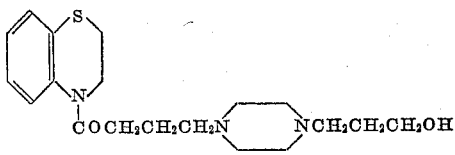

What is claimed is:

1. A compound of the formula

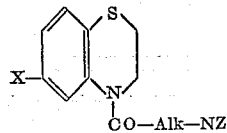

wherein X is selected from the group consisting of hydrogen and chlorine; Alk is a lower alkylene radical containing more than 1 carbon atom; and NZ is selected from the group consisting of di(lower alkyl)amino, piperidino, hydroxy(lower alkyl)piperidino, piperazino, methylpiperazino, and hydroxy(lower alkyl)piperazino radicals.

2. 6-chloro-4-(3-dimethylaminopropionyl) - 2,3 - dihydro-1,4-benzothiazine.

3. A compound of the formula

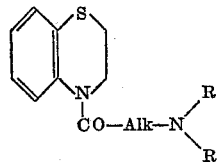

wherein Alk is a lower alkylene radical containing more than 1 carbon atom and R is a lower alkyl radical.

4. 4 - (3 - dimethylaminopropionyl) - 2,3 - dihydro-1,4-benzothiazine.

5. 2,3-dihydro-4-(3-piperidinopropionyl) - 1,4 - benzothiazine.

6. A compound of the formula

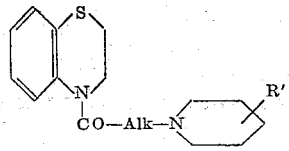

wherein Alk is a lower alkylene radical containing more than 1 carbon atom and R' is a hydroxy(lower alkyl)-radical.

7. 2,3 - dihydro-4-{3[4-(3-hydroxypropyl)piperidino]-propionyl}-1,4-benzothiazine.

8. A compound of the formula

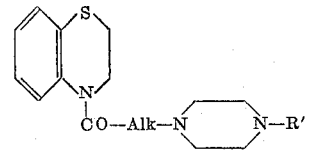

wherein Alk is a lower alkylene radical containing more than 1 carbon atom and R' is a hydroxy(lower alkyl)-radical.

9. 2,3-dihydro-4-{3-[4 - (2 - hydroxyethyl)piperazino]-propionyl}-1,4-benzothiazine.

10. In a process for the manufacture of compounds of the formula

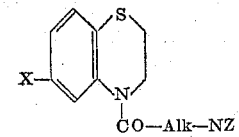

wherein X is selected from the group consisting of hydrogen and chlorine; Alk is a lower alkylene radical containing more than 1 carbon atom; and NZ is selected from the group consisting of di(lower alkyl)amino, piperidino, hydroxy(lower alkyl)piperidino, piperazino, methylpiperazino, and hydroxy(lower alkyl)piperazino radicals, the step which comprises contacting for as long as several hours at elevated temperatures and in a ketonic solvent a 4-haloalkanoyl-2,3-dihydro-1,4-benzothiazine of the formula

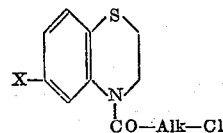

with an amine

NZ—H

X, Alk, and NZ having the meanings hereinbefore assigned.

References Cited in the file of this patent

UNITED STATES PATENTS 2,615,886    Dahlbom            Oct. 28, 1952

OTHER REFERENCES

Dahlbom: Acta Chem. Scand., vol. 5, pp. 102; 103; 105–113 (1951).

Dahlbom: Acta, Chem. Scand., vol. 7, pp. 879–884 (1953).

Dahlbom: Acta pharmacol. et toxicol., vol. 9, pp. 172–174 (1953).

Fujii: J. Pharm. Soc. Jap., vol. 77, pp. 347; 352 (April 1957).

Richter's Organic Chem., vol. IV, p. 278 (1947) (Elsevier Pub. Co., N.Y.).

Fujii: J. Pharm. Soc., Japan, vol. 77, pp. 362–366 (April 1957).

UNITED STATES PATENT OFFICE
CERTIFICATE OF CORRECTION

Patent No. 2,947,744                          August 2, 1960

Harman S. Lowrie

It is hereby certified that error appears in the printed specification of the above numbered patent requiring correction and that the said Letters Patent should read as corrected below.

Column 1, line 38, below "are exemplified by:" insert
-- 1,2-ethylene ($-CH_2CH_2-$)
Trimethylene ($-CH_2CH_2CH_2-$) --;
column 3, line 66, for "tis" read -- is --; column 4, line 57, for "wtih" read -- with --.

Signed and sealed this 31st day of January 1961.

(SEAL)
Attest:

KARL H. AXLINE                          ROBERT C. WATSON
Attesting Officer                         Commissioner of Patents